(12) United States Patent
De Jong et al.

(10) Patent No.: US 6,769,053 B1
(45) Date of Patent: Jul. 27, 2004

(54) ARRANGEMENT STORING DIFFERENT VERSIONS OF A SET OF DATA IN SEPARATE MEMORY AREAS AND METHOD FOR UPDATING A SET OF DATA IN A MEMORY

(75) Inventors: Eduard Karel De Jong, San Mateo, CA (US); Jurjen Norbert Eelco Bos, Heemskerk (NL)

(73) Assignee: Belle Gate Investment B.V., The Hague (NL)

(*) Notice: Subject to any disclaimer, the term of this patent is extended or adjusted under 35 U.S.C. 154(b) by 0 days.

(21) Appl. No.: 10/009,275

(22) PCT Filed: Jun. 10, 1999

(86) PCT No.: PCT/NL99/00360
§ 371 (c)(1),
(2), (4) Date: Dec. 10, 2001

(87) PCT Pub. No.: WO00/77640
PCT Pub. Date: Dec. 21, 2000

(51) Int. Cl.$^7$ ............................................. G06F 13/00
(52) U.S. Cl. ........................ 711/156; 711/159; 711/161; 711/162
(58) Field of Search ........................... 711/159, 162, 711/156; 235/380

(56) References Cited

U.S. PATENT DOCUMENTS

| | | | |
|---|---|---|---|
| 4,425,642 A | 1/1984 | Moses et al. | 370/477 |
| 4,921,278 A | 5/1990 | Shiang et al. | 283/87 |

(List continued on next page.)

FOREIGN PATENT DOCUMENTS

| | | |
|---|---|---|
| DE | 4126213 | 2/1993 |
| DE | 4242247 A1 | 6/1994 |
| DE | 196 00 081 | 7/1997 |
| EP | 0190733 | 8/1986 |
| EP | 0251861 A1 | 1/1988 |
| EP | 0466969 | 1/1992 |
| EP | 0581317 A2 | 2/1994 |
| EP | 0666550 | 8/1995 |
| EP | 0674295 A1 | 9/1995 |
| EP | 0 723 226 | 7/1996 |
| EP | 0849734 A2 | 6/1998 |
| EP | 0864996 A2 | 9/1998 |
| EP | 0917152 A1 | 5/1999 |
| FR | 2776153 | 9/1999 |
| JP | 01277993 A | 11/1989 |
| JP | 02156357 A | 6/1990 |
| JP | 05089303 A | 4/1993 |

(List continued on next page.)

OTHER PUBLICATIONS

K. Matsui, et al., "Video–Steganography: How to Secretly Embed a Signature in a Picture," IMA Intellectual Property Project Proceedings, vol. 1, Issue 1, pp. 187–206 (Jan. 1994).

(List continued on next page.)

*Primary Examiner*—Reba I. Elmore
(74) *Attorney, Agent, or Firm*—Finnegan, Henderson, Farabow, Garrett & Dunner, L.L.P.

(57) ABSTRACT

Computer-readable medium storing a data structure for supporting persistant storage of a set of data, the data structure including: (a) at least an oldest version of the set of data in first memory area, the first memory area including at least one first tag for uniqueley indentifying the oldest version, and (b) at least a most recently updated version of the set of data in a second, distinct memory area, the second memory area including at least one second tag for uniquely identifying the most recently updated version. The invention also relates to a computer arrangement including a processor and such a computer-readable medium, as well as to a method of updating sets of data having such tagged-data structures.

17 Claims, 3 Drawing Sheets

U.S. PATENT DOCUMENTS

| | | | |
|---|---|---|---|
| 4,930,129 A | 5/1990 | Takahira | 714/766 |
| 4,953,160 A | 8/1990 | Gupta | 370/494 |
| 5,057,997 A | 10/1991 | Chang et al. | 709/108 |
| 5,148,546 A | 9/1992 | Blodgett | 713/320 |
| 5,204,663 A | 4/1993 | Lee | 340/5.28 |
| 5,204,897 A | 4/1993 | Wyman | 710/200 |
| 5,283,885 A | 2/1994 | Hollerbauer | 711/106 |
| 5,404,377 A | 4/1995 | Moses | 375/145 |
| 5,446,901 A | 8/1995 | Owicki et al. | 709/310 |
| 5,452,431 A | 9/1995 | Bournas | 711/115 |
| 5,469,559 A | 11/1995 | Parks et al. | 711/106 |
| 5,481,715 A | 1/1996 | Hamilton et al. | 709/316 |
| 5,544,246 A | 8/1996 | Mandelbaum et al. | 705/65 |
| 5,594,227 A | 1/1997 | Deo | 235/380 |
| 5,649,118 A | 7/1997 | Carlisle et al. | 705/41 |
| 5,657,379 A | 8/1997 | Honda et al. | 379/93.28 |
| 5,721,781 A | 2/1998 | Deo et al. | 705/67 |
| 5,742,756 A | 4/1998 | Dillaway et al. | 713/200 |
| 5,768,385 A | 6/1998 | Simon | 705/69 |
| 5,781,723 A | 7/1998 | Yee et al. | 713/200 |
| 5,790,489 A | 8/1998 | O'Connor | 369/52.1 |
| 5,802,519 A | 9/1998 | De Jong | 707/100 |
| 5,832,119 A | 11/1998 | Rhoads | 382/232 |
| 5,862,117 A | 1/1999 | Fuentes et al. | 369/100 |
| 5,869,823 A | 2/1999 | Bublitz et al. | 235/380 |
| 5,881,152 A | 3/1999 | Moos | 713/193 |
| 5,884,316 A | 3/1999 | Bernstein et al. | 707/103 R |
| 5,894,550 A | 4/1999 | Thiriet | 714/54 |
| 5,896,393 A | 4/1999 | Yard et al. | 714/710 |
| 5,912,453 A | 6/1999 | Gungl et al. | 235/492 |
| 5,930,363 A | 7/1999 | Stanford et al. | 705/65 |
| 6,005,940 A | 12/1999 | Kulinets | 705/51 |
| 6,052,690 A | 4/2000 | De Jong | 707/101 |
| 6,094,656 A | 7/2000 | De Jong | 707/100 |
| 6,173,391 B1 | 1/2001 | Tabuchi et al. | 712/200 |
| 6,182,158 B1 | 1/2001 | Kougiouris et al. | 709/328 |
| 6,212,633 B1 | 4/2001 | Levy et al. | 713/153 |
| 6,220,510 B1 | 4/2001 | Everett et al. | 235/380 |
| 6,292,874 B1 | 9/2001 | Barnett | 711/153 |
| 6,349,336 B1 | 2/2002 | Sit et al. | 709/227 |

FOREIGN PATENT DOCUMENTS

| | | |
|---|---|---|
| JP | 09326046 A | 6/1999 |
| WO | WO 87/07062 | 11/1987 |
| WO | WO 94/10657 | 5/1994 |
| WO | WO 97/41562 | 11/1997 |
| WO | WO 98/19237 | 5/1998 |
| WO | WO 98/37526 | 9/1998 |
| WO | WO 99/16030 | 9/1998 |
| WO | WO 99/38162 | 7/1999 |

OTHER PUBLICATIONS

Chan, "Infrastructure of Multi–Application Smart Card," http://home.hkstar.com/~alanchan/papers/multiApplication-SmartCard/, Jul. 25, 2002.

Cordonnier, et al., "The Concept of Suspicion: A New Security Model for Identification Management in Smart Cards," http://inforge.unil.ch/isdss97/papers/48.htm, (1997).

Daniels, John et al., "Strategies for Sharing Objects in Distributed Systems," JOOP, Object Designers Ltd., Uk., pp. 27–36.

Gong, L. et al., "Going Beyond the Sandbox: An Overview of the New Security Architecture in the JavaDevelopment Kit 1.2" Proc. Usenix Sym. Internet Technologies and Systems, Dec. 8, 1997.

Islam, et al., "A Flexible Security Model for Using Internet Content," IBM Thomas J. Watson Research Center Papers, 'Online!', Jun. 28, 1997, from http://www.ibm.com/java/education/flexsecurity.

Lee, Chan Y., "Detecting Out–Of–Range References," http://127.0.0.1:8080/vtopic/isapi?action+View&VdkVgwKev=%2E@2E%2Fdata%2F1 993% 2F, Jul. 24. 2002.

Philips Semiconductor, "Designers Offered First 16–Bit Smart Card IC Architecture with Development Tools," Press Release, Jul. 25, 2002.

Ritchey, Tim, "Advanced Topics: The Java Virtual Machine," Java!, Chapter 14, pp. ii–x and 325–346, Sep. 22, 1995.

Sun Microsystems, Inc., "Java Card™ 2.0 Language Subset and Virtual Machine Specification," Oct. 13, 1997, Revision 1.0 Final.

Sun Microsystems, Inc., "Java Card™ 2.0 Programming Concepts," Oct. 15, 1997, Revision 1.0 Final.

"Sun Microsystems Announces Javacard API," Business Wire, Oct. 1996.

Sun Microsystems, Inc., "Java Card Runtime Environment (JCRE) 2.1 Specification—Draft 2," Dec. 14, 1998.

"Java Card Applet Developer's Guide," Revision 1.12, Aug. 19, 1998, Sun Microsystems, Inc.

Sun Microsystems, Inc., "Java Card™ 2.0 Application Programming Interfaces," Oct. 13, 1997, Revision 1.0 Final.

ARRANGEMENT STORING DIFFERENT VERSIONS OF A SET OF DATA IN SEPARATE MEMORY AREAS AND METHOD FOR UPDATING A SET OF DATA IN A MEMORY

FIELD OF THE INVENTION

The present invention relates to memory means comprising at least one set of data in a memory area. The memory means may be implemented with volatile RAM devices or with non-volatile silicon devices, such as EEPROM. Flash-EPROM or ROM. Usually, such memory stores operating system software modules, application programs and application data. In areas where such computer systems according to the invention may be particularly applicable, some or all of the operating system software modules are stored in ROM.

DESCRIPTION OF PRIOR ART

In some applications, typically financial transaction processes, storing must be done very safely. Such safe storage applications are known as requiring "Atomicity of Update" in "persistent" storage means. In order to carry out such safe updating, the use of update logs is known from the prior art. Such update logs register which parts of a set of data has to be changed during an update session. Only when the set of data together with its updated parts has been stored in memory, all references to the former version of the set of data may be removed.

OBJECT OF THE INVENTION

The object of the present invention is to support persistent application-data storage by providing a mechanism for atomicity of update for data stored in non-volatile memory devices, especially in silicon storage devices such as EEPROM or Flash-EEPROM.

SUMMARY OF THE INVENTION

Aspects of the invention are directed to methods and computer arrangements for storing a data structure for supporting the persistent storage of a set of data. In one aspect of the invention, a method is provided that stores, in the data structure, at least an oldest version of the set of data and a first tag identifying the oldest version in a first memory area. Further, the method includes storing, in the data structure, at least a most recently updated version of the set of data and a second tag identifying the most recently updated version in a second memory area. The method may also include deallocating the first memory area following the storing of the most recently updated version provided there are at least two versions of the set of data in the data structure.

The application of such unique tags related to the different memory areas allows to uniquely identify which one of the versions are older versions. Moreover, the application of such tags allows for identifying which versions relate to the same original set of data. Thus, in a memory, different versions of different sets of data may be present at the same time. Moreover, during updating the most recently updated version the older versions, as well as the most recently updated version, are not removed from memory. Only after an update action of the most recently updated version has been entirely completed the oldest version of the set of data may be removed from memory.

When the updating is interrupted during an update action, the most recently updated version is still present in the memory, thus guaranteeing the presence of at least one valid version of the set of data. Thus, "Atomicity of Update" is performed that guarantees either a complete replacement of the data or a complete unaltered copy of the original data, even if the update operation is disrupted.

In one embodiment, each of the versions of the set of data are stored in one or more memory pages, and each of the memory pages includes one tag, each tag comprising references to the set of data, a version number and a page number.

A page is defined as a memory area of consecutive memory locations which are dealt with as a unity such as appropriate for the storage technology concerned. Each page may correspond to one word line, thus facilitating memory unit read and write operations. Version numbers are assigned to the different generations of the set of data. Thus, different version numbers relate to different generations. Different page numbers refer to different pages within the same generation of the set of data.

The invention also relates to a computer arrangement including a processor and at least one computer-readable medium as defined above.

Preferably, the processor is arranged to write tags with redundancy as to the content and, after having read tags from the memory means, to analyze from the redundancy whether or not write errors have occurred. Such a redundancy can be used as an indication whether or not the tags concerned and the set of data to which the tags refer have valid values.

Preferably, the most recently updated version comprises a plurality of pages, each page having a unique tag, and the processor is arranged for updating said most recently updated version of said set of data and to write a predetermined tag of a predetermined one of said plurality of pages into said memory means as a last step of said updating. The predetermined tag, which is written last, can be read by the processor. If the processor detects the presence of this predetermined tag in the memory means, the processor can conclude that the updating action has been completed entirely.

The application of such tags provides for several new options. For instance, at least one of the tags may include additional data as to indicate ownership and use-rights, the processor being arranged to recognize ownership and use-rights from these additional data.

The use-rights may differ for different parts of the set of data and the processor may be arranged to recognize these different use-rights for these different parts.

Preferably, the processor is arranged to analyze tag values and is only allowed to access the versions of the set of data by reference through the tag values. Thus, access to the different versions of the set of data is not controlled by a usual program counter but by the tag values. In other words, the memory has become content addressable memory.

In the latter embodiment, the processor preferably comprises a central processing unit and a distinct memory managing unit, where the tag values are only known to the memory managing unit. Then, the physical address space of the memory means is not included in the address space of the central processing unit, especially not in the address space where application program or operating system software instructions are stored. In this manner, additional protection against "probing" can be obtained. To realize this potential protection, the memory managing unit may provide to the central processing unit additional interface functionality with a tag-size address register.

In order to increase the safety of stored data, the memory managing unit may encode tags with a cryptographic key prior to writing them into the memory, the cryptographic key being only known to the memory managing unit. Such a cryptographic key may relate to a cryptographic one-way function.

The present invention also relates to a method for supporting persistent storage of a set of data, comprising the steps of:

(a) storing an oldest version of said set of data in a first memory area, wherein said first memory area includes a first tag for uniquely identifying said oldest version, and (b) storing a most recently updated version of said set of data in a second distinct memory area, wherein said second memory area includes a second tag for, uniquely identifying said most recently updated version.

BRIEF DESCRIPTION OF THE DRAWINGS

Hereinafter, the present invention will be described in detail with reference to some drawings which are intended only to illustrate the present invention and not to limit its scope.

DESCRIPTION OF THE PREFERRED EMBODIMENT

Figure 1:
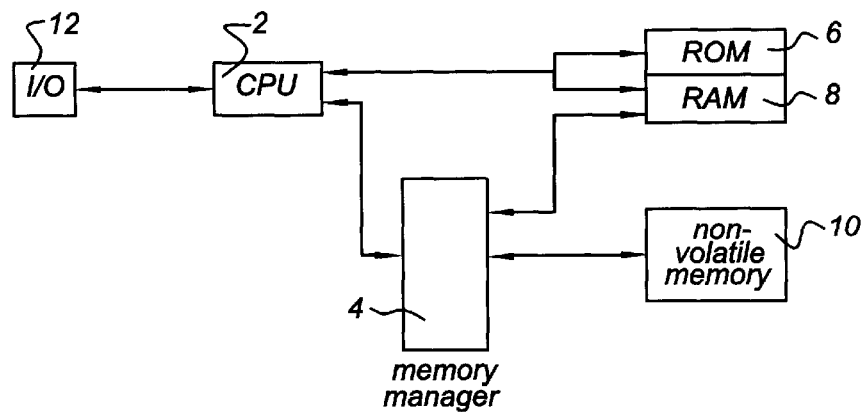
FIG. 1 shows an example of an embodiment according to the present invention.

FIG. 1 shows one possible arrangement in accordance with the present invention. A central processing unit 2 is connected to input/output means 12 and to memory which may comprise ROM 6. RAM 8, and non-volatile memory 10. Arranged apart from or within the central processing unit 2 there may be a memory manager 4. The manager 4 is arranged for carrying out memory functions which respect to the non-volatile memory 10 and preferably also the other memory sections ROM 6 and RAM 8. The embodiment shown in FIG. 1 relates to all kinds of management systems of data storage. However, the invention is especially beneficial with respect to data storage in non-volatile silicon devices rather than on hard disks. The important applications are in the field of embedded computer systems, and in single chip computers such as smart cards.

Figure 2:
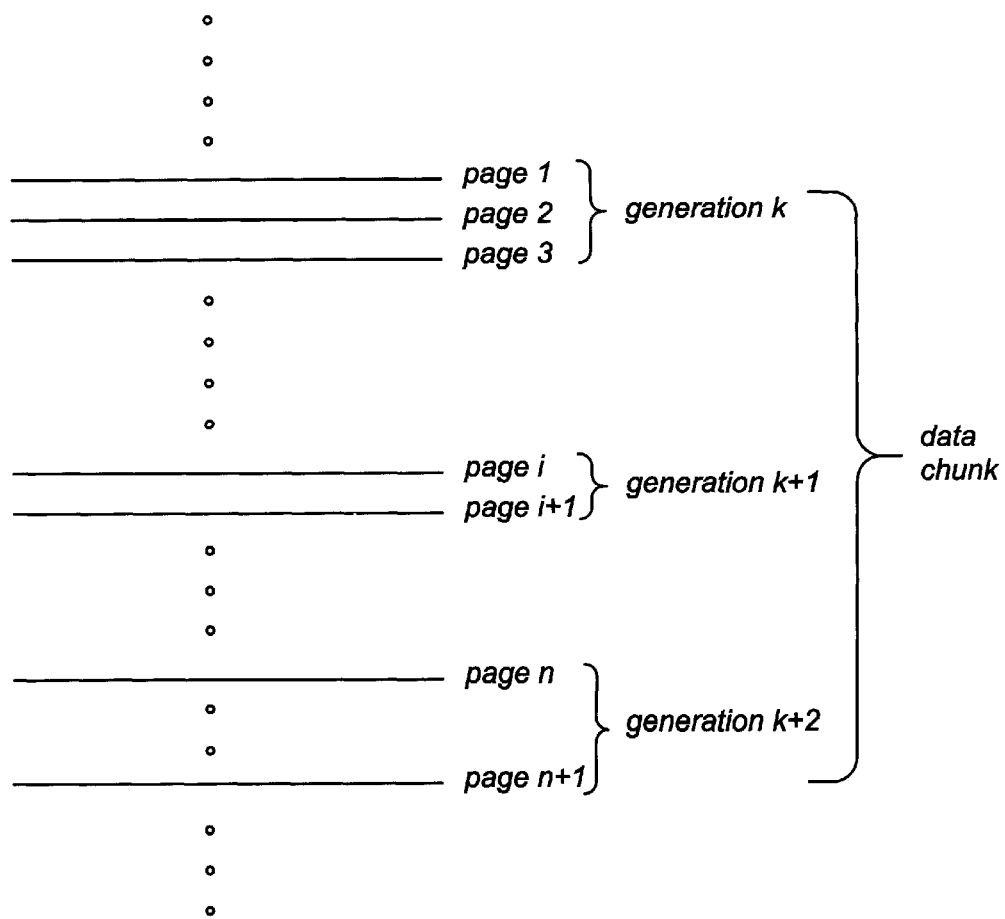
FIG. 2 shows a possible layout of a memory in accordance with the present invention.

FIG. 2 shows one possible arrangement of data storage in a memory in accordance with the present invention. The non-volatile data memory 10 may be partitioned in storage units. Here, these units of memory storage are called "pages". Conveniently, these pages may be of equal size, e.g. equal to the size of a "word-line" in silicon devices used to implement the memory. However, the pages may be of different sizes. The content of the memory is managed by the memory manager 4 page by page: allocation, updates, and de-allocation of application data storage involve manipulating one or more pages.

The memory comprises different generations (or versions) of a set of application data elements. Each generation may be stored in one or more pages. In FIG. 2, the situation is shown in which the memory comprises three different generations k, k+1, k+2 of one set of application data elements. The example shows that generation k occupies three pages 1, 2, and 3, generation k+1 occupies two pages i, i+1, and generation k+2 occupies two pages n, n+1. Generation k is the oldest version of the set of application data elements in the memory, whereas generation k+2 is the most recently updated version of the set of application data elements. Each of the generations k, k+1, k+2 may, e.g., relate to different versions of a software object.

The generations k, k+1, and k+2 are indicated to form a "data chunk" which term is used here as a reference to one single set of application data elements. Pages required for storage are allocated from any location in memory that is not occupied by a page as determined by the memory manager 4. The different generations k, k+1, k+2 of the data chunk shown in FIG. 2 may or may not be stored in memory in consecutive memory locations. The memory manager 4 is the unit to decide where to store the different generations. Even the pages within one generation need not be stored in consecutive pages. To illustrate this, pages n and n+1 are shown as being located remote from one another (indicated by dots between them).

In practice, the memory will contain several "data chunks", i.e., several sets of generations of different sets of data.

In a memory organized and managed in accordance with the present invention, atomicity of update is provided by the management policy carried out by the memory manager 4. After being stored, data related to a version of the set of application data elements will never be modified in the same memory area. In other words, a page once created is never modified. When the last updated set of application data elements needs to be amended in accordance with an application program running on the central processing unit 2, a new memory area, e.g., a new set of pages, is allocated by the memory manager 4. In this new memory area any changed values together with values of data elements of, the set of application data elements that have not been changed are stored by the memory manager 4. In this way, the memory 10 will hold at any time at least one consistent, valid version of the data chunk.

Such an updating action may, e.g., relate to a smart card. Although updating of data in a smart card only takes a very short time (for instance about 3 msec) there is a small chance that the smart card is removed from a communicating terminal prior to completing the data transaction with the terminal. Thus, the updating may be interrupted prior to completion. When this happens, at least the last updated version is still present in the memory of the smart card.

In one embodiment, after completing the update of the set of data, the memory manager 4 proceeds by de-allocating the memory area storing the oldest version of the set of data. The memory manager 4 may, e.g., control the presence of no more than 10 versions of one set of application data elements. In a practical realization the application program running on the central processing unit 2 will interact with the memory manager 4 to control the process of updating its data, e.g., to indicate completion of the update. The application program will notify the completion of the update to the memory manager 4, after which the memory manager 4 completes the writing operations in the memory 10. Such update process signaling is customary in transaction processing systems.

When several versions of the set of application data elements are present in the memory the modification history of the data may be analyzed through the memory manger 4. The memory manager 4 does this by providing means for the application program running in the central processing unit 2 to inspect, but not modify, data values in previous versions.

Figure 3:
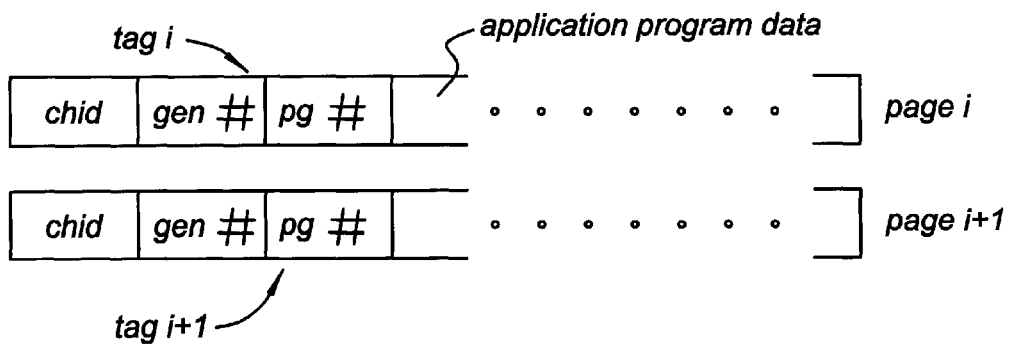
FIG. 3 shows the content of memory pages in a possible embodiment of the arrangement according to FIG. 2.

FIG. 3 shows a possible memory page structure in accordance with the present invention. It is assumed that the memory is divided into pages. FIG. 3 shows two pales i, i+1. Each page i, i+1, contains application program data and a tag i, i+1. Preferably, the tag value consists of three parts: a "chunk identifier" chid, a generation count gen#, and a page count pg#. The chunk identifier serves as a unique reference to a programmer's unit of stored data. The generation counter gen# identifies the version number of the data stored. At least two generations will be indicated by the generation counters gen#. The page counter pg# indicates the page number of the page concerned within the generation of the set of program data to which the page belongs. The page counter pg# does allow that data of a generation of a set of data is stored as a multiple number of pages.

In one specific realization of the invention the tag value is stored in the memory using a special encoding, e.g., using redundancy for instance with a qualifying number of bits set to one. This special encoding is used by the memory manager 4 to detect correct/incorrect data write operations. Only if the qualified number of bits is detected to be one (or high) the memory manager 4 decides that the tag value is valid. If this qualified number of bits is not set to one, the memory manager 4 decides that the tag value is invalid. Such a situation may, e.g., be caused by interrupting the power supplied to the memory device, for instance when a user of a smart card removes his smart card from a terminal prior to completion of a financial transaction.

In such an embodiment, prior to removing the oldest generation of the set of data, the memory manager 4 will determine the validity of the most recently updated generation. The specific tag encoding method may be determined from the physical characteristics of the silicon storage device used. It should be chosen to have a very high likelihood of resulting in an invalid encoding if that memory device fails to write the page in its entirety. In dependence on the memory chip design (i.e. the transistor technology used), before writing new data in a page, some memories will first change all memory location values of a specified page into either zeros or ones. Therefore, as indicated above it is sometimes better to check whether a qualified number of bits in a tag is one whereas in other cases it might be better to check the presence of a qualified number of bits to be zero. Then, if the check on the tag is found to be correct it is a matter of known chance whether or not the content of the remainder of the page related to the tag is also written correctly.

Figure 4:
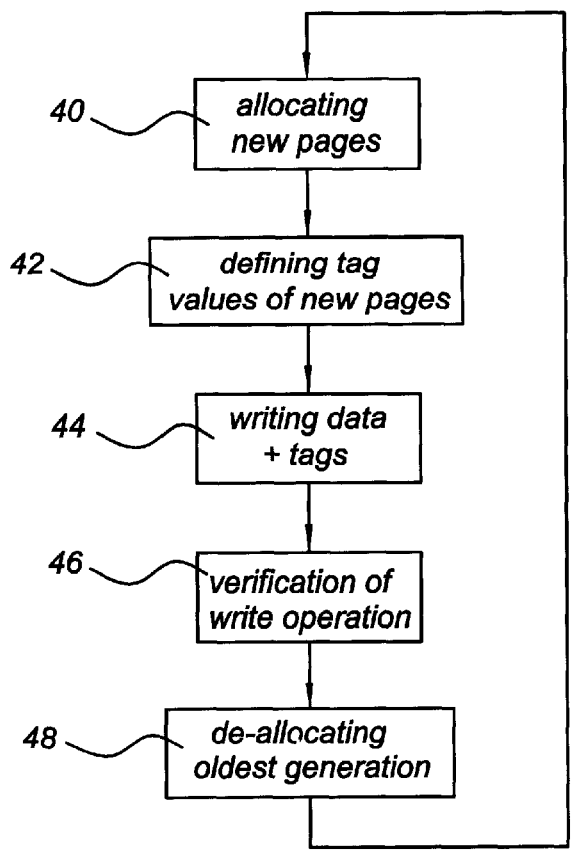
FIG. 4 illustrates a method in accordance with the present invention.

FIG. 4 summarizes the sequence of operations carried out by the memory manager 4-in one embodiment of the invention when updating a version of stored application data, as directed by an application program running on the central processing unit 2:

a. allocating a new set of pages in the memory 10, step 40;

b. defining the tag value of each new page of the new set of pages, step 42;

c. writing the application program data in its amended form and the corresponding tags to memory 10 page by page, step 44;

d. verifying for each page written that the result is correct, step 46; this verification step may be carried out by checking the tag value as indicated above;

e. de-allocating pages that hold the oldest generation of the set of data, step 48.

The tag value for each new page is defined with the assigned chunk identifier chid, the generation count value gen# of the most recently previous updated version incremented by 1, and the page count pg#.

Preferably, the pages are written to memory 10 page by page as indicated in step c. above. Preferably one predetermined page of the set of pages for one set of data must be written last, whereas all other pages can be written in any order. Conveniently, that predetermined page is the first page of the new set of pages. In practice, any of the pages may be written in parts. For example, a tag value of the page may be written separately from the application program data in the page. Preferably, however, the tag of the predetermined page, which is the last page to be written, is written in the last step of the updating action. This is a clear indication that the updating action has been completed. Until that tag of the predetermined page is written in memory, application program data written to any of the new pages may also be modified. However, it is to be noted that partial writes and modifications to page data may reduce the benefits obtainable with the invention, i.e., the total writing time may get longer. Writing the non-volatile memory 10, like EPROM, takes a relatively long time, nowadays about 3 msec. Therefore, it is best to write only once to memory 10, i.e., when the entire modified set of data is ready to be stored and not to write modified portions of the set of data in consecutive periods of time. Still, if time is available, as is often the case, it is common practice in the art to write modified portions of a set of data in non-volatile memory. However, this results in an increased number of write operations which leads to unnecessary wear of the non-volatile memory 10.

Therefore, in accordance with an embodiment of the invention, preferably, all steps necessary to completely amend a set of data are carried out on a working copy of the set of data in RAM 8 prior to writing the amended set of data to non-volatile memory 10.

Writing the tag value of the predetermined page as the last operation in an update session is an advantageous measure in realizing the atomicity of the multi-page update. The presence or absence of a valid tag in the predetermined page then serves as a "commit" flag: a valid tag in the predetermined page indicates both the validity of the written page and the irrevocable completion of the entire update process.

Memory storage of the application program data can be made even more secure when the date stored in the memory can only be addressed physically by the application using the chunk identifier chid. The memory 10 then has become a "content addressable memory" (CAM).

Although the memory manager 4 and the central processing unit 2 may be within one physical processing unit, it is especially advantageous for this latter feature that the central processing unit 2 and the memory manager 4 are two physically distinct units arranged to communicate with one another. It is to be understood that "physically distinct" may still refer to units manufactured on a single chip. Then, the physical address space of the memory 10 is not included in the address space of the central processing unit 2, specifically not in the address space where application program or operating system software instructions are stored. If, then, the memory manager 4 is also made tamper-resistant (like in a smart card), additional protection against "probing" will be obtained.

Figure 5:
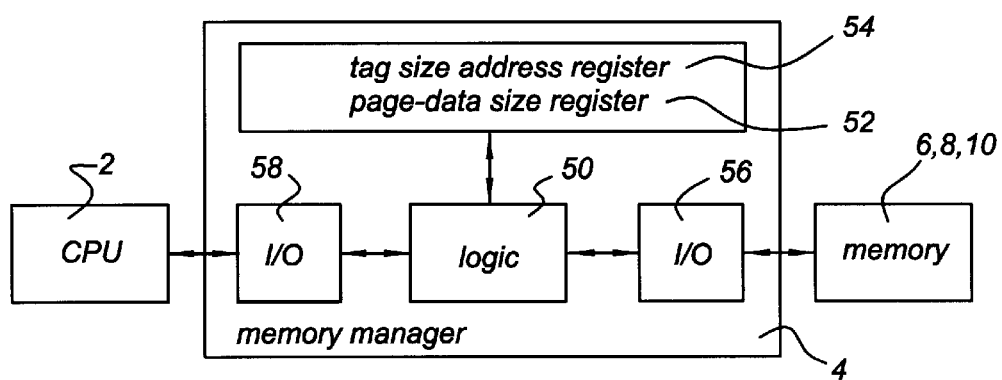
FIG. 5 illustrates a possible arrangement of a memory managing unit in accordance with the present invention.

To realize this potential additional protection for e.g. smart cards, the memory manager 4 may provide additional interface functionality, e.g., containing a tag-size address register 54 and a page-data size data register 52 (see FIG. 5). This interface 52, 54 is then complemented with a logic unit 50 to carry out logic functions for scanning and matching tags stored in the memory 10. In other words, the logic unit 50 is able to read tags from memory 10 and to address the memory 10 by analyzing the value of the tags.

The interface 52, 54 and associated logic unit 50 may be implemented in hardware.

In addition, specific hardware circuits 56, 58 will be present as interfaces between the memory 6, 8, 10 and the logic unit 50 and between the central processing unit 2 and the logic unit 50, respectively. The logic unit 50 may provide a dedicated address counter combined with a tag-comparing logic circuit. An alternative hardware circuit may contain content addressable memory logic circuits implemented per memory page at least for the storage bits reserved to contain the tag value.

Additional security benefits may be obtained with a memory managed according to the invention when in addition to the special detecting encoding the tag value is further encoded using cryptographic techniques. Such cryptographic tag encoding intends to hide application data related to structural information like chunk identifier chid, generation count gen#, page count pg#, contained in the tag values. Cryptographic encoding may be done with any encoding technique known to a person skilled in the art. One advantageous method includes the use of secret cryptographic one-way functions in which the one-way function steps are related to a secret key only known to the memory manager 4. In this way, the memory manager 4 is able to recognize a previous generation by applying the one-way function one or more times to the encoded tag value of that previous generation and then comparing the resulting tag value with the tag value of the most recently updated generation. This will hamper reconstruction of application program data from an evil-intended forced "dump" of the memory device content.

The tagged memory structure as explained hereinbefore provides several advantageous options. For instance, the tag may include additional data to indicate ownership of the associated application program data. Moreover, such additional data in the tag value might indicate use-rights or sets of use-rights for different users of the application program data. Such different use-rights may, e.g., be related to different access conditions to different parts of the (application) program data in the memory 10. One part of the (application) program data may, e.g., be defined as read-only, whereas another part of the application program data may be defined to be read/write access.

The invention efficiently provides a transaction log stored in memory since the memory contains the history of updates to specific application data-elements in the form of consecutive generations.

As explained above, additionally, the number of write operations to memory devices managed in accordance with the present invention may be reduced using the memory-update/transaction logging mechanism disclosed. Additionally, a reduced number of write operations provided by the invention may result in reduced costs of the silicon storage device by extending its useful life. Security of data stored in, especially, the non-volatile memory on tamper-resistant single chip computers, like smart cards, is increased. The increase of security may be entirely obtained by software measures. Hardware measures, like the distinct memory manager 4 apart from the central processing unit 2, may further increase the security but are not strictly necessary.

What is claimed is:

1. A computer-readable medium storing a data structure for supporting persistent storage of a set of data, said data structure comprising:

(a) at least an oldest version of said set of data and at least one first tag for identifying said oldest version in a first memory area; and
   (b) at least a most recently updated version of said set of data and at least one second tag for identifying said most recently updated version in a second, distinct memory area,
   wherein the first memory area is deallocated when there is at least two versions of the set of data available in the data structure.

2. The computer-readable medium according to claim 1, wherein each of the versions of said set of data are stored in one or more memory pages, and each of the memory pages includes one tag comprising references to said set of data, a version number and a page number.

3. The computer-readable medium according to claim 2, wherein each page corresponds to one word line.

4. The computer-readable medium according to claim 1, wherein the data structure is processed by a processor.

5. The computer-readable medium according to claim 4, wherein the processor is arranged to write the tags with redundancy as to their content and, after having read tags from the memory means, to analyze from said redundancy whether or not write errors have occurred.

6. The computer-readable medium according to claim 4, wherein the processor is arranged to analyze tag values and is only allowed to access said versions of said set of data by reference through said tag values.

7. The computer-readable medium according to claim 6, wherein said processor comprises a central processing unit and a distinct memory managing unit, and the tag values are only known to the memory managing unit.

8. A computer arrangement comprising:
   a memory including:
      a first memory area having at least an oldest version of said set of data and at least one first tag for identifying said oldest version, and
      a second memory area having at least a most recently updated version of said set of data and at least one second tag for identifying said most recently updated version; and
   a processor configured to process the versions of the set of data,
   wherein the most recently updated version comprises a set of pages, each page having a unique tag, and the processor is arranged for updating said most recently updated version of said set of data and to write a predetermined tag of a predetermined one of said set of pages into said memory as a last step of said updating.

9. A computer arrangement comprising:
   a memory including:
      a first memory area having at least an oldest version of said set of data and at least one first tag for identifying said oldest version, and
      a second memory area having at least a most recently updated version of said set of data and at least one second tag for identifying said most recently updated version; and
   a processor configured to process the versions of the set of data,
   wherein at least one of said tags includes additional data as to indicate ownership and use-rights, and the processor is arranged to recognize ownership and use-rights from these additional data.

10. The computer arrangement according to claim 9, wherein said use-rights differ for different parts of the set of data and the processor is arranged to recognize different use-rights for these different parts.

11. A computer arrangement comprising:
- a memory including:
  - a first memory area having at least an oldest version of said set of data and at least one first tag for identifying said oldest version, and
  - a second memory area having at least a most recently updated version of said set of data and at least one second tag for identifying said most recently updated version; and
- a processor configured to process the versions of the set of data,
- wherein the processor is arranged to analyze tag values and is only allowed to access said versions of said set of data by reference through said tag value and the processor comprises a central processing unit and a distinct memory managing unit, and the tag values are only known to the memory managing unit, and wherein said memory managing unit encodes tags with a cryptographic key prior to writing them into the computer-readable medium, said cryptographic key being only known to the memory managing unit.

12. The computer arrangement according to claim 11, wherein said cryptographic key relates to a cryptographic one-way function.

13. method for supporting persistent storage of a set of data in a computer-readable medium, comprising the steps of:
- a) storing an oldest version of said set of data and at least one first tag for identifying said oldest version in a first memory area;
- (b) storing a most recently updated version of said set of data and at least one second tag for identifying said most recently updated version in a second, distinct memory area; and
- (c) de-allocating, following step (b), the first memory area having stored therein the oldest version of said set of data provided at least two versions of said set of data remain in said memory means.

14. The method according to claim 13, comprising the further step of verifying said storing in step (b) by a predetermined operation carried out on said second tag.

15. The method of updating a set of data according to claim 13, wherein said most recently updated version comprises a plurality of pages, each page having a unique tag, and a predetermined tag of a predetermined one of said plurality of pages is stored as a last step in step (b) in order to identify completion of said storing in step (b).

16. A system including:
- a computer-readable medium storing a data structure for supporting persistent storage of a set of data, the data structure comprising:
  - (a) at least an oldest version of said set of data in a first memory area including a first set of one or more pages, said computer-readable medium including at least one tag for identifying said oldest version, and
  - (b) at least a most recently updated version of said set of data in a second distinct memory area including a second set of one or more pages, said computer-readable medium including at least one tag for identifying said most recently updated version; and
- a processor for processing the data structure,
- wherein each page in the first and second memory areas includes one or more consecutive memory locations that are collectively processed during memory operations, and wherein each page further includes a respective tag having a version number of the set of data and a page number of the respective page.

17. A method for supporting persistent storage of a set of data in a computer-readable medium, comprising:
- storing an oldest version of said set of data in a first memory area including a first set of one or more pages, wherein the computer-readable medium includes at least one tag for identifying the oldest version, wherein each page in the first memory area includes one or more consecutive memory locations that are collectively processed during memory operations;
- storing a most recently updated version of said set of data in a second distinct memory area including a second set of one or more pages, said computer-readable medium including at least one tag for identifying said most recently updated version, wherein each page in the second memory area includes one or more consecutive memory locations that are collectively processed during memory operations; and
- providing each page in the first and second set of pages with a respective tag having a version number of the set of data and a page number of the respective page.

* * * * *

UNITED STATES PATENT AND TRADEMARK OFFICE
CERTIFICATE OF CORRECTION

PATENT NO. : 6,769,053 B1 Page 1 of 1
DATED : July 27, 2004
INVENTOR(S) : De Jong et al.

It is certified that error appears in the above-identified patent and that said Letters Patent is hereby corrected as shown below:

Title page,
Item [57], delete the ABSTRACT in its entirety and insert therefor:

-- Computer arrangements are disclosed including a processor and a computer-readable medium storing a data structure for supporting the persistent storage of a set of data. The data structure may include at least an oldest version of the set of data in a first memory area having at least one first tag for uniquely identifying the oldest version. Further, the data structure includes at least a most recently updated version of the set of data in a second, distinct memory area including at least one second tag for uniquely identifying the most recently updated version. Further, a method is disclosed for supporting the persistent storage of the set of data by storing the oldest version of the first set of data and the first tag in the first memory area and storing the most recently updated version of the set of data and the second tag in the second memory area, and deallocating the first memory area when the most recently updated version is stored, provided at least two versions of the set of data remain in memory.--.

Column 9,
Line 27, before "method" insert -- A --.

Signed and Sealed this

Second Day of November, 2004

JON W. DUDAS
*Director of the United States Patent and Trademark Office*